(12) United States Patent
Carlson

(10) Patent No.: US 12,547,642 B2
(45) Date of Patent: *Feb. 10, 2026

(54) SYSTEMS AND METHODS FOR DYNAMIC CROSS-CONTEXTUAL IMPLEMENTATION

(71) Applicant: Thomson Reuters Enterprise Centre GmbH, Zug (CH)

(72) Inventor: Jesse McCrillis Carlson, Cottage Grove, MN (US)

(73) Assignee: Thomson Reuters Enterprise Centre GmbH, Zug (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/922,230

(22) Filed: Oct. 21, 2024

(65) Prior Publication Data
US 2025/0045300 A1    Feb. 6, 2025

Related U.S. Application Data

(63) Continuation of application No. 18/466,709, filed on Sep. 13, 2023, now Pat. No. 12,141,168.

(60) Provisional application No. 63/405,922, filed on Sep. 13, 2022.

(51) Int. Cl.
*G06F 16/2457* (2019.01)
*G06F 16/28* (2019.01)

(52) U.S. Cl.
CPC ...... *G06F 16/282* (2019.01); *G06F 16/24578* (2019.01); *G06F 16/285* (2019.01)

(58) Field of Classification Search
CPC . G06F 16/282; G06F 16/24578; G06F 16/285
See application file for complete search history.

(56) References Cited

U.S. PATENT DOCUMENTS

| | | |
|---|---|---|
| 5,333,254 A | 7/1994 | Robertson |
| 6,360,227 B1 | 3/2002 | Aggarwal et al. |
| 6,704,729 B1 | 3/2004 | Klein et al. |
| 7,162,480 B2 | 1/2007 | Vishik |
| 7,428,533 B2 | 9/2008 | Kapur et al. |

(Continued)

OTHER PUBLICATIONS

Patent Cooperation Treaty, International Search Report and Written Opinion issued for PCT Application No. PCT/US2023/074015, dated Dec. 12, 2023, 6 pages.

*Primary Examiner* — Jorge A Casanova
(74) *Attorney, Agent, or Firm* — Norton Rose Fulbright US LLP

(57) ABSTRACT

Aspects of the present disclosure provide systems, methods, apparatus, and computer-readable storage media that support dynamic cross-contextual taxonomy search and interpretation. A multi-layer hierarchical taxonomy may be indicated by metadata that is retrieved based on input search term(s). The multi-layer hierarchical taxonomy may includes a first plurality of nodes that are arranged as parent-child node pairs, and that are grouped into node groups based on common parent nodes. The multi-layer hierarchical taxonomy may be dynamically modified to include a second plurality of nodes that includes duplicates of the parent-child node pairs in which the parent-child relationships are reversed. The nodes may then be regrouped based on common parent nodes, and one or more node groups may be deleted if all the parent-child node pairs are duplicated in another node group. A graphical user interface (GUI) may display a ranked listing of informational elements that correspond to the node groups.

20 Claims, 8 Drawing Sheets

(56) References Cited

U.S. PATENT DOCUMENTS

| | | |
|---|---|---|
| 8,788,523 B2 | 7/2014 | Martin et al. |
| 9,177,050 B2 | 11/2015 | Lu et al. |
| 9,785,678 B1 | 10/2017 | Peery et al. |
| 10,102,560 B1 | 10/2018 | Kurup et al. |
| 10,909,144 B1 | 2/2021 | Dutta et al. |
| 2003/0067498 A1 | 4/2003 | Parisi |
| 2006/0053174 A1 | 3/2006 | Gardner et al. |
| 2006/0074836 A1 | 4/2006 | Gardner et al. |
| 2007/0276854 A1 | 11/2007 | Gold |
| 2016/0048518 A1 | 2/2016 | Miller et al. |
| 2022/0005558 A1 | 1/2022 | Malfait et al. |
| 2022/0215017 A1 | 7/2022 | Pendyala |
| 2023/0401247 A1 | 12/2023 | Lehal et al. |
| 2024/0169002 A1 | 5/2024 | Jiang et al. |

Reranked Parent/Child Nodes

Judicial Notice
    Evidence Admissibility    80
    Exceptions    50

Timeliness    30
    Notice of Appeal    67
    Notice of Breach    25
    Notice of Defect    20
    Notice to Buyer    20

Exceptions    2
    Judicial Notice    45
    Sufficiency of Notice    30

Sufficiency of Notice    15
    Exceptions    15
    Repetition    10
                            5

Case Law Search Tool

Select and combine filter values from the tabs below to find cases specifically on your matter

| Legal issue & outcome | Fact pattern | Cause of action | More options + |

Find legal issue & outcome ~402
Examples: Diversity Jurisdiction, Estoppel, Standing ~404

406 — ☑ Taxonomy View    ☐ Cross-Context View ~408

🔍 notice ~424

~410

- Security Interests and Secured Transactions (367) ~418
  ~414
  ~416
  - Notice (15) ~420
- Summary Judgment Procedure (103)
  - Notice of Claims (2)
  - Sufficiency of Notice (8)
- Surety Bond (8)
  - Notice (2)
- Waiver of Contractual Rights and Obligations (11)
  - Notice Requirement (11)
- Warranty (353)
  - Notice of Breach (38)
- Withdrawal of Consent (3)
  - Notice (1)

Case Law Search Tool

Select and combine filter values from the tabs below to find cases specifically on your matter

Legal issue & outcome | Fact pattern | Cause of action | More options +

Find legal issue & outcome — 404
Examples: Diversity Jurisdiction, Estoppel, Standing 🔍 notice □ Notice (136) — 434
  ⊞ □ Sufficiency of Notice (84)
  ⊞ □ General Determination (22)
  ⊞ □ Security and Secured Transactions (15) — 436
  ⊞ □ Jury Question (4)
  ⊞ □ Failure to Prosecute (3)
  ⊞ □ Debt Collection (2)
  ⊞ □ Surety Bond (2)
  ⊞ □ Contempt Proceeding (1)
  ⊞ □ Lien Foreclosure (1)
  ⊞ □ Waiver (1)
  ⊞ □ Withdrawal of Counsel (1)
□ Notice of Claims (104)
□ Notice of Appeal (75)

432

402

406 — Taxonomy View    ☑ Cross-Context View — 408

SYSTEMS AND METHODS FOR DYNAMIC CROSS-CONTEXTUAL IMPLEMENTATION

CROSS-REFERENCE TO RELATED APPLICATIONS

The present application is a continuation of U.S. patent application Ser. No. 18/466,709, filed Sep. 13, 2023 and entitled "SYSTEMS AND METHODS FOR DYNAMIC CROSS-CONTEXTUAL IMPLEMENTATION," which claims the benefit of priority from U.S. Provisional Patent Application No. 63/405,922, filed Sep. 13, 2022 and entitled "SYSTEMS AND METHODS FOR DYNAMIC CROSS-CONTEXTUAL IMPLEMENTATION," the disclosures of which are incorporated by reference herein in their entirety.

TECHNICAL FIELD

The present disclosure relates generally to electronic devices and tools that perform data identification. More particularly, aspects of the present disclosure relate to dynamic cross-contextual taxonomy search and interpretation.

BACKGROUND

Information may be categorized and sorted in a variety of ways to represent the knowledge and to enable efficient searching and retrieval of particular information. For example, documents may be organized according to a taxonomy (e.g., a system of classification) in order to group similar documents together. This may enable a user that is searching for a particular category or context of information to search groupings that are related to the category or context in the taxonomy instead of randomly searching through an entirety of the stored documents. One illustrative context in which taxonomies are helpful is the legal context. For example, storing legal documents in a taxonomy, such as according to a hierarchical taxonomy, may enable a researcher that is researching a particular legal concept or law to begin at a high level and identify a relevant taxonomy entry that is related to the subject of their search, and to continue honing in on relevant documents by narrowing their search as they traverse down the hierarchical taxonomy. As an example, a researcher may be looking for court cases related to judgements in products liability cases, and the researcher may begin at a top level of the taxonomy by looking for an entry relating to court cases (as compared to legal journals), followed by looking for an entry at the next level for civil cases (as compared to criminal cases). The researcher may continue traversing the taxonomy through lower layers with entries related to torts, indirect liability, and products liability in order to find a listing of court cases that are relevant to their search. Such a taxonomy can be very helpful and can improve the efficiency of searching through a large volume of legal documents if the researcher knows the legal concept they are searching for with enough specificity to traverse the taxonomy and if the legal concept is sufficiently narrow that it can be narrowed down in the above-described manner. However, if the researcher does not know the topic they are looking for with sufficient detail to traverse some layers of the taxonomy, or if the topic is likely to be related to multiple different contexts or broad ideas, such a hierarchical taxonomy may not be useful in filtering out unrelated documents from a large quantity of legal documents.

SUMMARY

Aspects of the present disclosure provide systems, methods, apparatus, and computer-readable storage media that support dynamic cross-contextual taxonomy search and interpretation. In aspects, legal document metadata may be received from one or more data sources by a legal research tool (e.g., an electronic tool), and the legal document metadata may indicate a multi-layer hierarchical taxonomy that categorizes and organizes legal documents stored at the data sources. In some aspects, the multi-layer hierarchical taxonomy may include two layers, a first layer that represents legal contexts and a second layer that represents legal concepts. Legal contexts (e.g., broad contexts or subjects in which legal issues arrive) may include security interests and secured transactions, products liability, felonies, summary judgment procedure, jury questions, contempt proceedings, and the like, and legal concepts (e.g., more specific issues or aspects of the broader legal subjects) may include notice, pleading requirements, juror challenges, appeals, motions to strike, and the like, as non-limiting examples. Typically, when such a taxonomy is used to categorize legal documents, when a search is performed, search results may be provided in ranked listings of results that are first organized by parent nodes in the taxonomy (e.g., legal contexts) and then by child nodes in the taxonomy (e.g., legal concepts). However, aspects herein describe dynamic modification of the multi-layer hierarchical taxonomy to provide cross-context interpretation that provides search results using different organization and ranking that may improve user experience. Such dynamic taxonomy modification and interpretation may provide these benefits in particular situations in which the legal research tool includes a type-ahead search field (e.g., a search field that periodically polls for input in order to perform searches as terms are input instead of waiting for a user to enter an entirety of the search terms and submit the terms). For example, the multi-layer hierarchical taxonomy may include a first plurality of nodes that include a first plurality of parent-child node pairs, and the multi-layer hierarchical taxonomy may be dynamically modified by adding a second plurality of nodes that are duplicates of the first plurality of nodes and that have a reversed parent-child relationship. As an example, if the first plurality of nodes includes a parent node that corresponds to a first legal context and that is connected to a child node that corresponds to a first legal concept, the second plurality of nodes includes a parent node that corresponds to the first legal concept and that is connected to a child node that corresponds to the first legal context. The dynamic modification may also include grouping the second plurality of nodes into node groups based on common parent nodes. For example, node pairs that have parent nodes that correspond to a first legal concept may be grouped in a first node group, node pairs that have parent nodes that correspond to a second legal concept may be grouped in a second node group, etc. One or more node groups of the first plurality of nodes may be removed from the multi-layer hierarchical taxonomy if all child nodes of the respective group belong to new groups of the second plurality of nodes. After the dynamic modification, the node groups may be ranked based on counts associated with the parents nodes, and members of each node group may be ranked based on counts associated with the child nodes. A graphical user interface (GUI) of the legal research tool may display a ranked list of informational elements that correspond to the ranked node groups. Navigation through the ranked list, by a user, may enable identification of legal documents that correspond to the search terms provided by the user.

The dynamic modification of the multi-layer hierarchical taxonomy described herein may provide benefits as compared to legal research tools that provide search results that are ordered according to legal taxonomies. For example, by re-grouping and re-ranking the dynamically modified nodes, informational items that are more relevant to a user query can be pushed closer to the top of the list of search results. This may improve the speed and efficiency of legal research performed by the user, thereby improving utility of the legal research tool and the user experience. Additionally, regrouping the nodes after the duplication enables a user to view search results and select documents across multiple contexts (or any other type of knowledge domain represented by a first level of the multi-layer hierarchical taxonomy) in ways that were not previously possible. This may improve research efficiency and user experience in situations in which the user is unsure of a particular legal context to search or in which the user is interested in a legal concept in multiple different contexts. Additionally, because individual nodes that are wholly subsumed under new nodes are removed from the multi-layer hierarchical taxonomy (e.g., original node groups for which all of the child nodes are included in new node groups), the ranked list provided by the legal research tool described herein is more navigable than if the original nodes are merely duplicated and added to the multi-layer hierarchical taxonomy. Thus, the legal research tool may enable the user to efficiently search for legal issues and receive more relevant results, thereby improving the speed and efficiency of the legal research and improving the user experience.

It is also noted that, although the discussion that follow is directed to embodiments in the legal field involving legal cases and legal research, it will be appreciated that aspects disclosed herein are applicable to any situation in which documents, content, and/or any type of information may categorized and ordered using taxonomies. As such, the discussion herein with respect to legal cases and court opinions is for illustrative purposes and should not be construed as limiting in any way.

In one particular aspect, a method for dynamic cross-contextual taxonomy search and interpretation includes receiving, by one or more processors, one or more search terms from a user. The method also includes retrieving, by the one or more processors, metadata indicating a multi-layer hierarchical taxonomy from a database based on the one or more search terms. The multi-layer hierarchical taxonomy includes a first plurality of nodes that includes a first plurality of parent nodes and a first plurality of child nodes that are related to the first plurality of parent nodes. The method includes dynamically modifying, by the one or more processors, the multi-layer hierarchical taxonomy to include a second plurality of nodes that includes additional parent nodes and additional child nodes that are related to the additional parent nodes. The additional parent nodes include one or more duplicates of the first plurality of child nodes, and the additional child nodes include duplicates of the first plurality of parent nodes. The method also includes grouping, by the one or more processors, parent-child node pairs of the multi-layer hierarchical taxonomy based on matching parent nodes to generate a plurality of node groups. The method further includes displaying, by the one or more processors, a ranked list of informational elements that correspond to the plurality of node groups via a graphical user interface (GUI).

In another particular aspect, a system for dynamic cross-contextual taxonomy search and interpretation includes a memory and one or more processors communicatively coupled to the memory. The one or more processors are configured retrieve metadata indicating a multi-layer hierarchical taxonomy from a database based on the one or more search terms. The multi-layer hierarchical taxonomy includes a first plurality of nodes that includes a first plurality of parent nodes and a first plurality of child nodes that are related to the first plurality of parent nodes. The one or more processors are configured to dynamically modify the multi-layer hierarchical taxonomy to include a second plurality of nodes that includes additional parent nodes and additional child nodes that are related to the additional parent nodes. The additional parent nodes include one or more duplicates of the first plurality of child nodes, and the additional child nodes include duplicates of the first plurality of parent nodes. The one or more processors are also configured to group parent-child node pairs of the multi-layer hierarchical taxonomy based on matching parent nodes to generate a plurality of node groups. The one or more processors are further configured to display a ranked list of informational elements that correspond to the plurality of node groups via a GUI.

In another particular aspect, a non-transitory computer-readable storage device includes instructions that, when executed by one or more processors, cause the one or more processors to perform operations for dynamic cross-contextual taxonomy search and interpretation. The operations include receiving one or more search terms from a user. The operations also include retrieving metadata indicating a multi-layer hierarchical taxonomy from a database based on the one or more search terms. The multi-layer hierarchical taxonomy includes a first plurality of nodes that includes a first plurality of parent nodes and a first plurality of child nodes that are related to the first plurality of parent nodes. The operations include dynamically modifying the multi-layer hierarchical taxonomy to include a second plurality of nodes that includes additional parent nodes and additional child nodes that are related to the additional parent nodes. The additional parent nodes include one or more duplicates of the first plurality of child nodes, and the additional child nodes include duplicates of the first plurality of parent nodes. The operations also include grouping parent-child node pairs of the multi-layer hierarchical taxonomy based on matching parent nodes to generate a plurality of node groups. The operations further include displaying a ranked list of informational elements that correspond to the plurality of node groups via a GUI.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which:

FIGS. 3A-C illustrate examples of nodes of a legal taxonomy undergoing dynamic cross-contextual interpretation according to the method of FIG. 2;

FIGS. 4A-B illustrate examples of a graphical user interface (GUI) of a legal research tool that is configured to perform dynamic cross-contextual interpretation of a taxonomy from a search according to one or more aspects.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Various features and advantageous details are explained more fully with reference to the non-limiting aspects that are illustrated in the accompanying drawings and detailed in the following description. Descriptions of well-known starting materials, processing techniques, components, and equipment are omitted so as not to unnecessarily obscure the aspects of the disclosure in detail. It should be understood, however, that the detailed description and the specific examples, while indicating various implementations, are given by way of illustration only, and not by way of limitation. Various substitutions, modifications, additions, and/or rearrangements within the scope of the disclosure will become apparent to those skilled in the art from this disclosure.

Figure 1:
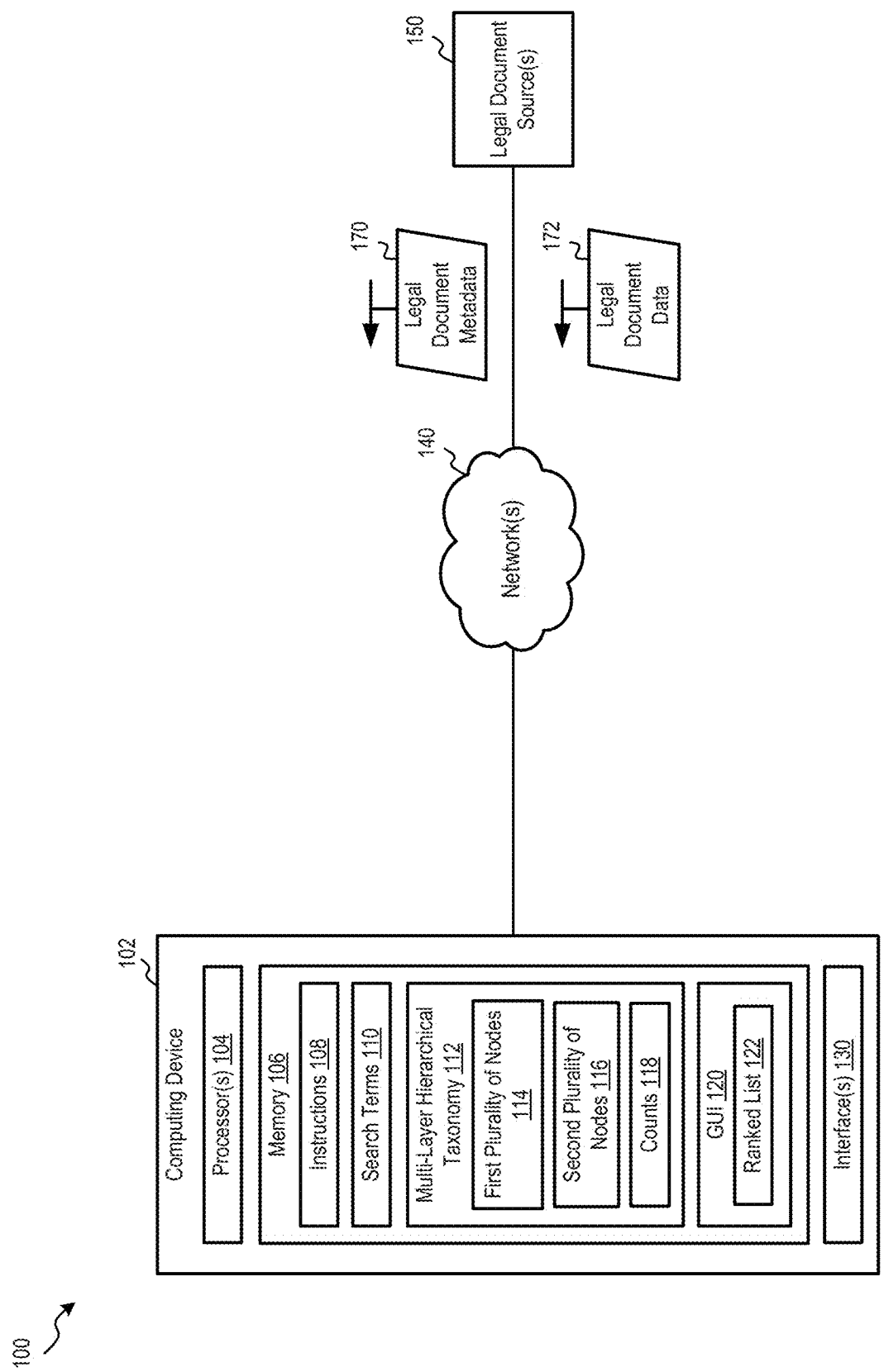
FIG. 1 is a block diagram of an example of a system that supports dynamic cross-contextual taxonomy search and interpretation according to one or more aspects.

Referring to FIG. 1, an example of a system that supports dynamic cross-contextual taxonomy search and interpretation according to one or more aspects is shown as system 100. As shown in FIG. 1, the system 100 may include a computing device 102, one or more legal document data sources (referred to herein collectively as "legal document data sources 150"), and one or more networks 140. In some implementations, the system 100 may include more or fewer components than are shown in FIG. 1, such as additional computing devices, client devices, or the like, one or more servers or cloud service components, or additional legal document data sources, or the legal document data sources 150 and the computing device 102 may be combined into a single device, as non-limiting examples. These elements, and their individual components, may cooperatively operate to provide functionality in accordance with the discussion herein.

The computing device 102 may be configured to perform one or more operations described herein to support dynamic cross-contextual taxonomy search and interpretation. In some aspects, the computing device 102 may include or correspond to a desktop computing device, a laptop computing device, a personal computing device, a tablet computing device, a mobile device (e.g., a smart phone, a tablet, a personal digital assistant (PDA), a wearable device, and the like), a server, a virtual reality (VR) device, an augmented reality (AR) device, an extended reality (XR) device, a vehicle (or a component thereof), an entertainment system, other wired or wireless computing devices, or a combination thereof, as non-limiting examples. In the implementation shown in FIG. 1, the computing device 102 includes one or more processors 104, a memory 106, and one or more communication interfaces 130.

It is noted that functionalities described with reference to the computing device 102 are provided for purposes of illustration, rather than by way of limitation and that the exemplary functionalities described herein may be provided via other types of computing resource deployments. For example, in some implementations, computing resources and functionality described in connection with the computing device 102 may be provided in a distributed system using multiple servers or other computing devices, or in a cloud-based system using computing resources and functionality provided by a cloud-based environment that is accessible over a network, such as the one of the one or more networks 140. To illustrate, one or more operations described herein with reference to the computing device 102 may be performed by one or more servers or a cloud-based system that communicates with one or more client or user devices.

The one or more processors 104 may include one or more microcontrollers, application specific integrated circuits (ASICs), application-specific standard products (ASSPs), field programmable gate arrays (FPGAs), central processing units (CPUs) and/or graphics processing units (GPUs) having one or more processing cores, or other circuitry and logic configured to facilitate the operations of the computing device 102 in accordance with aspects of the present disclosure. The memory 106 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state, network memory, cloud memory, local memory, or a combination thereof. Software and/or firmware configured to facilitate operations and functionality of the computing device 102 may be stored in the memory 106 as instructions 108 that, when executed by the one or more processors 104, cause the one or more processors 104 to perform the operations described herein with respect to the computing device 102, as described in more detail below. Additionally, the memory 106 may be configured to store search terms 110, a multi-layer hierarchical taxonomy 112 (e.g., as indicated by received metadata) that includes a first plurality of nodes 114, a second plurality of nodes 116, and counts 118, and a graphical user interface (GUI) 120. Illustrative aspects of the search terms 110, the multi-layer hierarchical taxonomy 112, and the GUI 120 are described in more detail below. Although shown as being stored in memory 106, in some other implementations, the system 100 may include one or more databases integrated in or communicatively coupled to the computing device 102

(e.g., communicatively coupled to the one or more processors 104) that are configured to store any of the search terms 110, the multi-layer hierarchical taxonomy 112, and the GUI 120, or a combination thereof. Additionally or alternatively, the GUI 120 may be provided to a display device for display to a user of the computing device 102.

The one or more communication interfaces 130 may be configured to communicatively couple the computing device 102 to the one or more networks 140 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like). The one or more networks 140 may include one or more of a wired network, a wireless communication network, a cellular network, a cable transmission system, a local area network (LAN), a wireless LAN (WLAN), a metropolitan area network (MAN), a wide area network (WAN), the Internet, the Public Switched Telephone Network (PSTN), or another network, as illustrative examples. In some implementations, the computing device 102 includes one or more input/output (I/O) devices (not shown in FIG. 1) that include one or more display devices, a keyboard, a stylus, one or more touchscreens, a mouse, a trackpad, a microphone, a camera, one or more speakers, haptic feedback devices, or other types of devices that enable a user to receive information from or provide information to the computing device 102. In some implementations, the computing device 102 is coupled to a display device, such as a monitor, a display (e.g., a liquid crystal display (LCD) or the like), a touch screen, a projector, a VR display, an AR display, an XR display, or the like. In some other implementations, the display device is included in or integrated in the computing device 102. Alternatively, the computing device 102 may be configured to provide information to support display at one or more other devices, such as a user device, a client device, or a mobile device, as non-limiting examples.

As briefly described above, the computing device 102 may be communicatively coupled to one or more other devices or systems via the one or more networks 140, such as the legal document data sources 150. The legal document data sources 150 may include one or more devices or components that are configured to store, and to provide access to, legal documents and case law-related data. For example, the legal document data sources 150 may include one or more databases, one or more computing devices, one or more servers, one or more storage devices, one or more cloud storage resources, or the like, that are configured to store the legal document and the case law-related data. Legal document may include any documents that include information related to cases or legal issues, and may include tables containing case law documents, published legal opinions, procedural documents and motions, editorial analysis, key numbers, legal blogs, court opinion reporting systems, third party case law sources, etc. In some implementations, editorial analysis may include headnotes. Headnotes may refer to editorially created summaries of the law addressed in court opinions. Key numbers may include key numbers of a research taxonomy. For example, the Westlaw Key Number System is a legal taxonomy with over 120,000 fine-grained categories. In aspects, headnotes may be assigned a key number assigning a point of law to one or more categories. Other types of legal taxonomies are also possible within aspects described herein.

During operation of the system 100, a user of the computing device 102 may access a legal research tool executed by the computing device 102. The legal research tool may enable the user to search for various legal documents from one or more databases, and information related to the retrieved documents in addition to the documents themselves may be displayed via the GUI 120. Examples of such a GUI are illustrated and described with reference to FIGS. 4A-B. As part of the legal research undertaken by the user, the user may search for legal documents using a particular legal taxonomy that categorizes the documents into multiple different categories across multiple different layers and based on relationships between the categories. Such a taxonomy may be referred to as a multi-layer hierarchical taxonomy 112. Different layers of the multi-layer hierarchical taxonomy 112 may correspond to different domains of legal knowledge. As a non-limiting example, the multi-layer hierarchical taxonomy 112 may include a two-layer taxonomy in which a first layer includes informational items that represent legal contexts, such as security interests and secured transactions, products liability, felonies, summary judgment procedure, jury questions, contempt proceedings, and the like, and in which a second layer includes information items that represent legal concepts, such as notice, pleading requirements, juror challenges, appeals, motions to strike, and the like. In this example, a legal researcher that is searching for legal documents may traverse the multi-layer hierarchical taxonomy 112 using the GUI 120, as further described below, by first looking for a context that is relevant to the researcher, and then looking for documents related to a particular legal concept related to the context. However, this may not be helpful if the researcher does not know the context of the information they are searching for, or if they are interested in a particular concept in general (e.g., without regards to a specific context). To enable more efficient searching of the multi-layer hierarchical taxonomy 112, the computing device 102 may perform dynamic cross-contextual interpretation of the multi-layer hierarchical taxonomy 112 and may modify the GUI 120 to provide search results in an order that provides more relevant information and that is more likely to provide the information the user is searching for near the beginning of the search results than typical legal search tools that display search results based on the original ordering of the multi-layer hierarchical taxonomy 112.

To start the searching process, the user (e.g., a legal researcher) may provide a user input that indicates the search terms 110. In some implementations, the GUI 120 may include a search bar, and the user may enter the search terms into the search bar using a keyboard, a touchscreen, or another input/output (I/O) device or interface. In some such implementations, the search bar may be a type-ahead search field that is configured to perform searches based on terms as they are entered, without waiting for the selection of a "search" or "enter" button by the user. For example, the computing device 102 may periodically poll the user input provided to the type-ahead search field, such as every few milliseconds, and based on the text entered at the time of the polling, the computing device 102 may perform a search of the legal document data sources 150 and display results via the GUI 120. Thus, the user may be able to see some search results as they enter the search terms 110 and, if the search results do not appear to be sufficiently relevant, change the search terms 110 being entered without having to run another search themselves, which may improve the efficiency of the legal searching provided by the legal research tool and the computing device 102. Once the computing device 102 has received the search terms 110 (e.g., through submission by the user using a search button and/or through polling), the computing device 102 may issue a request for related information to the legal document data sources 150, and in response, the computing device 102 may receive legal document metadata 170 from the legal document data sources 150. The legal document metadata 170 may indicate the multi-layer hierarchical taxonomy 112 that includes various informational elements that are related to the information in the request provided by the computing device 102. For example, if the search terms 110 include the term "notice," the multi-layer hierarchical taxonomy 112 indicated by the legal document metadata 170 may include informational elements related concept(s) of notice in the context of security interests and transactions, concept(s) of notice in the context of summary judgment procedures, and concept(s) of notice in other legal contexts. Each informational element related to a context or concept (or other categories supported by the multi-layer hierarchical taxonomy 112) may correspond to a node of the multi-layer hierarchical taxonomy 112. In the example in which the multi-layer hierarchical taxonomy 112 includes two layers and is related to legal issues, nodes in the first layer may correspond to legal contexts and may be considered to be parent nodes of nodes in the second layer, which correspond to legal concepts, if there is a connection between the nodes. For example, if there is a concept of notice in the context of security interests and secured transactions, a node that corresponds to security interests and secured transactions is a parent node for a child node that corresponds to a concept of notice in that context. In aspects, the multi-layer hierarchical taxonomy 112 may include the first plurality of nodes 114, and the first plurality of nodes 114 may include a first plurality of parent nodes and a first plurality of child nodes that are related to the first plurality of parent nodes, similar to as described above.

In some implementations, the first plurality of nodes 114 are grouped into multiple node groups based on common parent nodes. For example, each parent-child node pair of the first plurality of nodes 114 may be assigned to a node group that includes other parent-child node pairs that have the same parent node. The node groups may be ranked on counts 118. For example, counts 118 may include first counts that represent counts of legal documents that correspond to parent nodes of the first plurality of nodes 114 and second counts that represent counts of legal documents that correspond to the child nodes of the first plurality of nodes 114. The node groups may be ranked, such as in descending order, based on the first counts (e.g., the counts 118 that correspond to the parent nodes). Additionally, child nodes within the node groups may be ranked, such as in descending order, based on the second counts (e.g., the counts 118 that correspond to the child nodes). In some implementations, the GUI 120 may display a ranked list of informational elements that correspond to the node groups of the first plurality of nodes 114. For example, the GUI 120 may include multiple view options for displaying search results, including a standard taxonomy view option and a cross-contextual taxonomy view option. Selection of the standard taxonomy view option by the user may cause the GUI 120 to display the ranked list of informational items according to the original organization of the multi-layer hierarchical taxonomy 112 (e.g., a non-dynamically modified and interpreted taxonomy view). An example of such a display is described further herein with reference to FIG. 4A. Alternatively, selection of the cross-contextual taxonomy view option by the user may cause dynamic modification of the multi-layer hierarchical taxonomy 112, as further described below, and after the dynamic modification and cross-contextual interpretation, the results may be displayed within the GUI 120 as the ranked list 122. An example of such a display is described further herein with reference to FIG. 4B. In other implementations, the computing device 102 may be configured to always perform and display the dynamically modified and cross-contextually interpreted taxonomy or to do so as a default.

To cross-contextually interpret the multi-layer hierarchical taxonomy 112, the computing device 102 may dynamically modify the multi-layer hierarchical taxonomy 112 to include the second plurality of nodes 116 by duplicating one or more of the first plurality of nodes 114 and reversing the parent-child node relationships. For example, the second plurality of nodes 116 may include additional parent nodes and additional child nodes that are related to the additional parent nodes, where the additional parent nodes include one or more duplicates of the child nodes of the first plurality of nodes 114 and the additional child nodes include duplicates of parent nodes of the first plurality of nodes 114. The second plurality of nodes 116 may be added to the multi-layer hierarchical taxonomy 112, increasing the size of the multi-layer hierarchical taxonomy 112 to up to twice the original size at this intermediate stage. As an illustrative example, the computing device 102 may, for each child node of the first plurality of nodes 114, add a duplicate of the child node as a new parent node of the second plurality of nodes 116, and for each parent node of the first plurality of nodes 114, add a duplicate of the parent node as a child node of the second plurality of nodes 116. In some implementations, all of the first plurality of nodes 114 are duplicated in such a manner. In some other implementations, nodes belonging to two relationships with more than one child are duplicated. Because the parent-child relationship of the node pairs of the second plurality of nodes 116 is reversed as compared to the first plurality of nodes 114, the parent nodes of the second plurality of nodes 116 correspond to legal concepts and the child nodes of the second plurality of nodes 116 correspond to legal contexts.

After adding the second plurality of nodes 116 to the multi-layer hierarchical taxonomy 112, the computing device 102 may group parent-child node pairs of the second plurality of nodes 116 into node groups based on matching parent nodes. For example, the computing device 102 may assigning each of parent-child node pair of the second plurality of nodes 116 to one of the plurality of node groups based on a parent node of a parent-child node pair matching a parent node of a node group. As an example, multiple parent-child node pairs of the second plurality of nodes 116 may have parent nodes that correspond to the legal concept of notice, and each of these multiple parent-child node pairs may be assigned to a first node group. As another example, multiple parent-child node pairs of the second plurality of nodes 116 may have parent nodes that correspond to the legal concept of exceptions, and each of these multiple parent-child node pairs may be assigned to a second node group. An example of such grouping is further described herein with reference to FIG. 3B.

After grouping the second plurality of nodes 116, the computing device 102 may remove one or more node groups of the plurality of node groups of the first plurality of nodes 114 based on duplicates of all child nodes of the one or more node groups being included in one or more other node groups of the second plurality of nodes 116. This process of removal may remove nodes that have been "moved" into new node groups (e.g., based on commonality of legal concepts, which correspond to the parent nodes of the second plurality of nodes 116). For example, if the first plurality of nodes 114 includes a first node group having a parent node that represents notice of appeal and a child node that represents timeliness and a second node group having a parent node that represents notice of defect and a child node that represents timeliness, the first node group and the second node group may be removed based on the second plurality of nodes 116 including a third node group having a parent node that represents timeliness and child nodes that represent notice of appeal and notice of defect. However, node groups of the first plurality of nodes 114 may not be removed if there is no other node group with the corresponding child node as a child node or a parent node or if fewer than all of the children of the node group may be removed (according to this removal scheme). An example of such removal is further described herein with reference to FIG. 3B.

After duplicating and removing nodes from the multi-layer hierarchical taxonomy 112, the computing device 102 may rank the remaining node groups based on the counts 118 that are associated with parent nodes of the remaining node groups, similar to as described above for the ranking of the first plurality of nodes 114. The computing device 102 may also rank child nodes within each of the node groups based on the counts 118 that are associated with the child nodes, in a similar manner. This ranking may be in descending order, such that node groups that correspond to a legal context or a legal concept that is associated with the most legal documents within the legal document data sources 150 are ranked higher than legal contexts or legal concepts that are associated with fewer legal documents in the legal document data sources 150. An example of such ranking (e.g., reranking) is described further herein with reference to FIG. 3C.

After ranking the remaining node groups of the multi-layer hierarchical taxonomy 112, the computing device 102 may display the ranked list 122 of informational elements that correspond to the remaining node groups via the GUI 120. In some implementations, the GUI 120 may display the ranked list 122 in a hierarchical arrangement in which informational elements that correspond to parent nodes are included in a first layer (e.g., a first column) and informational elements that correspond to child nodes are included in a second layer (e.g., a second column). The informational elements may be displayed in descending order of the counts 118 for node groups (e.g., parent nodes), as described above. For at least some of the groups of informational elements, a count associated with the parent node may be equal to a sum of the counts associated with child nodes in the corresponding node group. For example, for a first informational element included in the first layer, a count associated with the first informational element may be equal to a sum of counts of each informational element in the second layer that has a relationship to the first informational element. An example of the GUI 120 displaying the ranked list 122 in this manner is further described with reference to FIG. 4B. In some implementations, the GUI 120 may include selectable icons that are configured to cause display of, or to hide, informational elements of an associated parent node or an associated child node. Additionally, clicking on one of the counts 118 may cause retrieval of at least some of the related legal documents from the legal document data sources 150. For example, the computing device 102 may receive legal document data 172 that represents legal documents that correspond to the parent node or child node of the multi-layer hierarchical taxonomy 112 for which the associated count was selected. The legal document data 172, or a portion thereof, may be displayed via the GUI 120, such as in a document pane or tab, that enables a user to view at least a portion of a legal document on screen.

As described above, the system 100 supports dynamic cross-contextual interpretation of a taxonomy from a search. This dynamic cross-contextual interpretation and modification of the multi-layer hierarchical taxonomy 112 may provide benefits as compared to legal research tools that provide search results that are ordered according to legal taxonomies. For example, by re-grouping and re-ranking the dynamically modified nodes of the multi-layer hierarchical taxonomy 112, informational items that are more relevant to a user query (e.g., the search terms 110) can be pushed closer to the top of the ranked list 122. This may improve the speed and efficiency of legal research performed by a user, thereby improving utility of the legal research tool executed by the computing device 102 and the user experience. Additionally, regrouping the nodes after the duplication (e.g., after adding the second plurality of nodes 116) enables the user to view search results (e.g., the ranked list 122) and select documents across multiple contexts (or any other type of knowledge domain represented by a first level of the multi-layer hierarchical taxonomy 112) in ways that were not previously possible. This may improve research efficiency and user experience in situations in which the user is unsure of a particular legal context to search or in which the user is interested in a legal concept in multiple different contexts. Additionally, because individual nodes that are wholly subsumed under new nodes are removed from the multi-layer hierarchical taxonomy 112 (e.g., node groups of the first plurality of nodes 114 for which all of the child nodes are included in node groups of the second plurality of nodes 116), the ranked list 122 is more navigable than if the original nodes are merely duplicated and added to the multi-layer hierarchical taxonomy. Thus, the system 100 may enable the user to efficiently search for legal issues and receive more relevant results, thereby improving the speed and efficiency of the legal research and improving the user experience.

Figure 2:
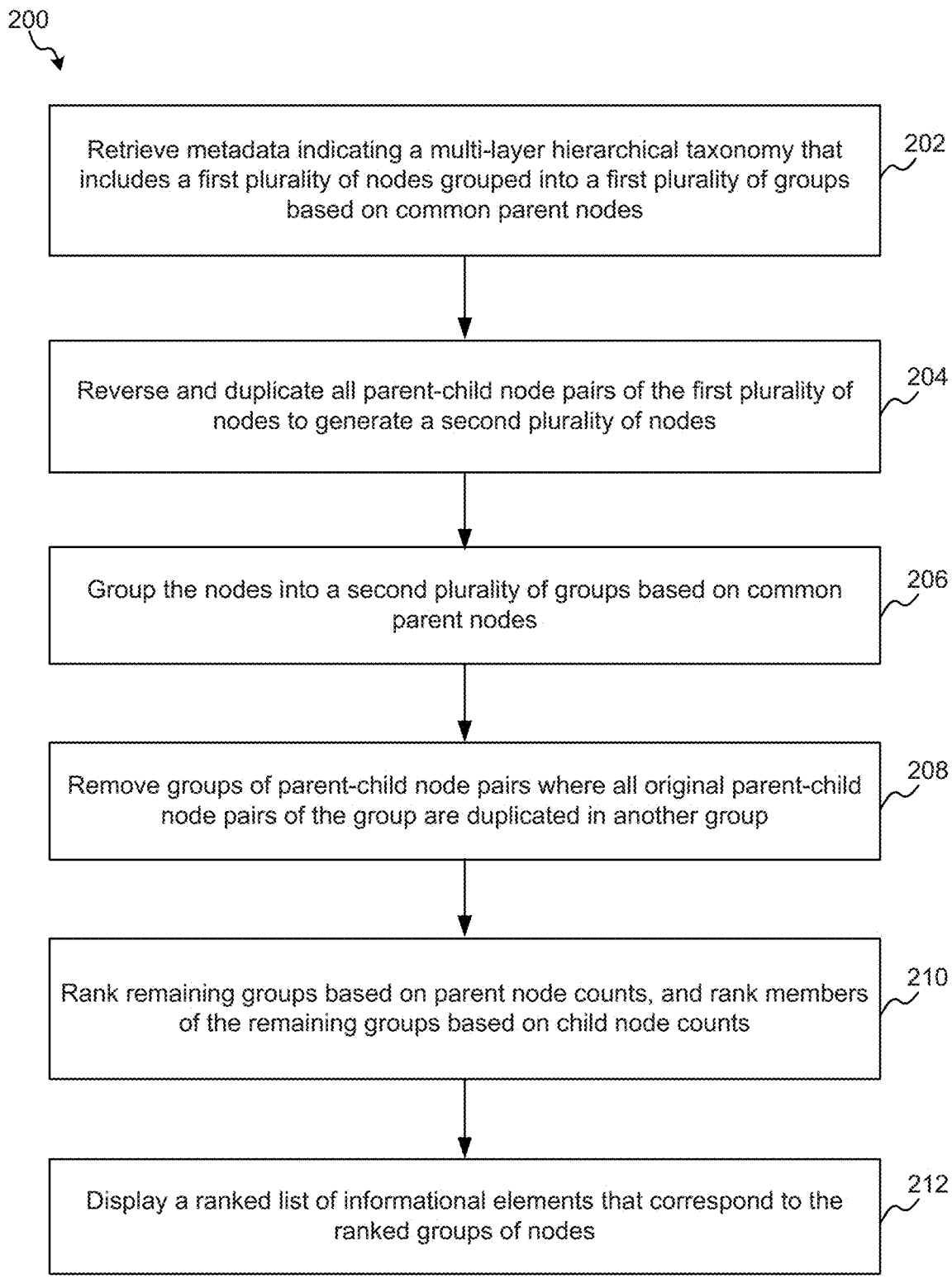
FIG. 2 is a flow diagram illustrating an example of a method for dynamic cross-contextual interpretation of a taxonomy from a search according to one or more aspects.
Figure 3A:
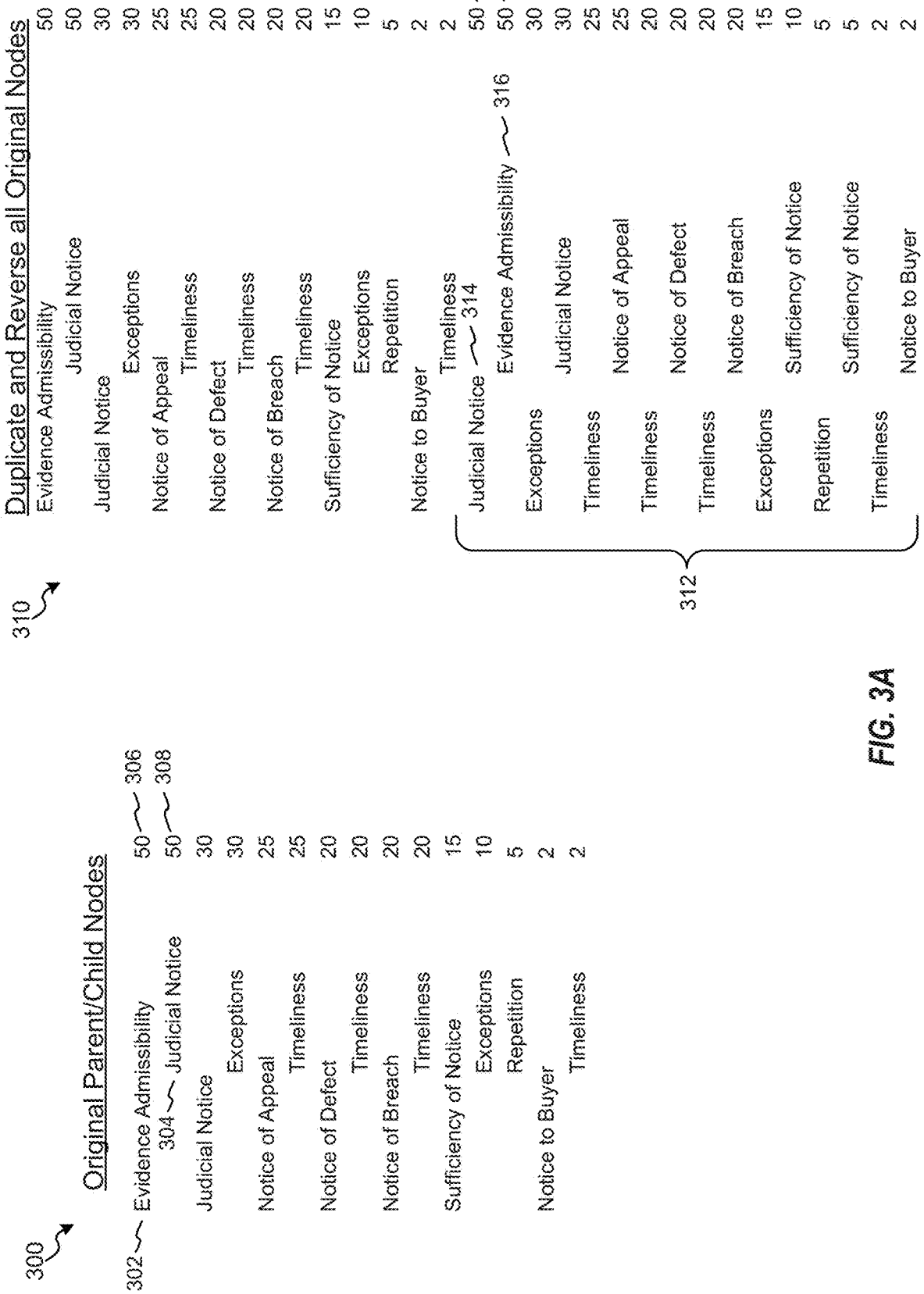
Figure 3B:
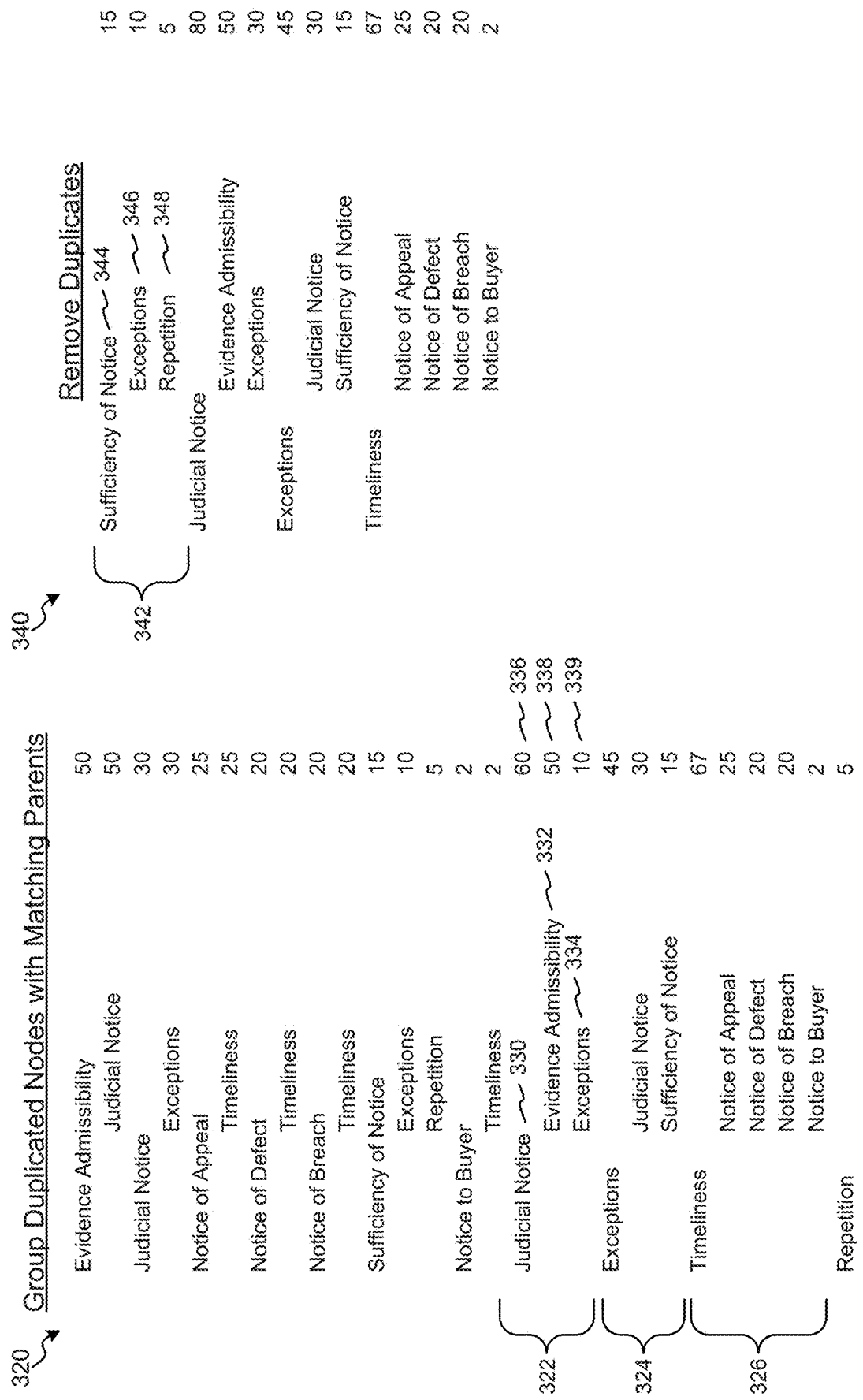

FIG. 2 is a flow diagram of a method 200 for dynamic cross-contextual interpretation of a taxonomy from a search according to one or more aspects. In some implementations, the operations of the method 200 may be stored as instructions that, when executed by one or more processors (e.g., the one or more processors of a computing device or a server), cause the one or more processors to perform the operations of the method 200. In some implementations, these instructions may be stored on a non-transitory computer-readable storage device or a non-transitory computer-readable storage medium. In some implementations, the method 200 may be performed by the system 100 of FIG. 1 (e.g., by the computing device 102). The method 200 of FIG. 2 may be described using examples of a legal taxonomy illustrated in FIGS. 3A-C. FIGS. 3A-C depict examples of nodes of a legal taxonomy undergoing dynamic cross-contextual interpretation according to the method 200 of FIG. 2. The examples described and shown in FIGS. 3A-C may exist at various stages of the method 200, such as after performance of operations of the method 200 of FIG. 2, as explained below The method 200 includes retrieving metadata that indicates a multi-layer hierarchical taxonomy, at 202. The multi-layer hierarchical taxonomy may include a first plurality of nodes grouped into a first plurality of groups based on common parent nodes. For example, a search for the term "notic" in a type-ahead search field may return a taxonomy 300 (e.g., a multi-layer hierarchical taxonomy) of legal contexts and legal concepts that are related to notice (e.g., a closest match to the partial search term entered in the search field). The taxonomy 300 includes multiple node groups that are grouped by common parent nodes and ranked by counts associated with parent nodes, with child nodes within each node group ranked by counts associated with the child nodes. In some implementations, the taxonomy 300 has a maximum depth of two (e.g., the taxonomy 300 includes a first layer and a second layer). When a user navigates the taxonomy 300 via typeahead, they are selecting eligible nodes of the taxonomy 300. An "original" version of the eligible nodes are indicated by the received metadata, and these node groups are ranked by level one (L1) frequency (e.g., parent node frequency) and then by L1 terms (e.g., alphabetically), and child nodes within the node groups are ranked by L2 frequency (e.g., child node frequency) and then by L2 terms (e.g., alphabetically).

In the example shown in FIG. 3A, the taxonomy 300 includes a first node group that includes a parent node 302 that represents "evidence admissibility" (e.g., a first legal context) and a child node 304 that represents "judicial notice" (e.g., a first legal concept). The parent node 302 is associated with a first count 306 ("50"), and the child node 304 is associated with a second count 308 ("50"). In this example node group, the first count 306 is equal to the second count 308 because there is only one child node for this node group. The taxonomy 300 also includes a second node group, a third node group, a fourth node group, a fifth node group, a sixth node group, and a seventh node group. The second node group includes a parent node that represents "judicial notice" and a child node that represents "exceptions". The third node group includes a parent node that represents "notice of appeal" and a child node that represents "timeliness". The fourth node group includes a parent node that represents "notice of defect" and a child node that represents "timeliness". The fifth node group includes a parent node that represents "notice of breach" and a child node that represents "timeliness". The sixth node group includes a parent node that represents "sufficiency of notice" and a child nodes that represent "exceptions" and "repetitions". The seventh node group includes a parent node that represents "notice to buyer" and a child node that represents "timeliness".

At this stage, nodes or groups can be selected, but the node groups are defined and ranked as in the taxonomy 300. As such, parent/child relationships in the taxonomy 300 are displayed ranked by frequency of parent the parent nodes, then child nodes. However, there are additional potential relationships that are not reflected in the parent/child relationships of the taxonomy 300. As an example, there is a relationship between the child node that represents "judicial notice" as a legal concept and the parent node that represents "judicial notice" as a legal context. However, this relationship is not represented by the taxonomy 300, and thus may not be identifiable by the user performing the search.

The method 200 includes reversing and duplicating all parent-child node pairs of the first plurality of nodes to generate a second plurality of nodes, at 204. For example, a taxonomy 310 may be generated that includes the nodes in the node groups of the taxonomy 300 and that also includes additional node groups 312. Each node group of the additional node groups 312 may include a parent node that corresponds to one of the child nodes of the taxonomy 300 and one or more child nodes that correspond to parent nodes of the taxonomy 300, such that the parent/child relationships are reversed. This reversal causes parent nodes to represent legal concepts and child nodes to represent legal contexts, contrary to in taxonomy 300 in which parent nodes represent legal contexts and child nodes represent legal concepts. As a particular example, the additional node groups 312 may a node group that includes a parent node 314 that represents "judicial notice" and a child node 316 that represents "evidence admissibility". In this example, the parent node 314 is a duplicate of the child node 304, and the child node 316 is a duplicate of the parent node 302. Similar to the nodes 302, 304 of the taxonomy 300, the parent node 314 is associated with a third count 318 ("50") and the child node 316 is associated with a fourth count 319 ("50"). The fourth count 319 may be the same as first count 306 and the third count 318 may be the same as the second count 308. The other additional node groups 312 similarly include duplicates of the node groups from the taxonomy 300 with the parent/child relationships reversed.

The method 200 includes grouping the nodes into a second plurality of groups based on common parent nodes, at 206. For example, the nodes from the taxonomy 300 and the additional node groups 312 from the taxonomy 310 may be grouped into new node groups in a taxonomy 320 in FIG. 3B. The new node groups include a first new node group 322, a second new node group 324, and a third new node group 326. The first new node group 322 includes a parent node 330 that represents "judicial notice", a child node 332 that represents "evidence admissibility", and a child node 334 that represents "exceptions". The parent node 330 is associated with a count 336 ("60"), the child node 332 is associated with a count 338 ("50"), and the child node 334 is associated with a count 339 ("10"). In this example, the count 336 associated with the parent node 330 is equal to a sum of the count 338 and the count 339 that are associated with the child node 332 and the child node 334, respectively. The second new node group 324 includes a parent node that represents "exceptions", a child node that represents "judicial notice," and a child node that represents "sufficiency of notice". The third node group 326 includes a parent node that represents "timeliness," a child node that represents "notice of appeal," a child node that represents "notice of defect," a child node that represents "notice of breach," and a child node that represents "notice to buyer". In this manner, the taxonomy 320 finds matches between nodes that are not initially grouped together, and these nodes are grouped together and added to the original taxonomy (e.g., the original result list).

The method 200 includes removing groups of parent-child node pairs where all original parent-child node pairs of the group are duplicated in another group, at 208. For example, a taxonomy 340 includes only one node group from the taxonomy 300 of FIG. 3A, an illustrative retained node group 342. The other node groups from the taxonomy 300 are removed because each parent-child node pair of the other node groups are included in one of the new node groups 322, 324, or 326. For example, the node groups with parent nodes that represent "evidence admissibility", "notice of appeal", "notice of defect", "notice of breach", and "notice to buyer" are removed from the taxonomy 340. Additionally, node groups from the additional node groups 312 of FIG. 3A that have all original parent-child node pairs duplicated in another group are removed. For example, the node group with the parent node that represents repetition is removed because all node pairs of this group are included in the retained node group 342. The retained node group 342 includes a parent node 344 that represents "sufficiency of notice", a child node 346 that represents "exceptions", and a child node 348 that represents "repetitions". In this manner, all matches are identified across knowledge domains, and cross-taxonomy matches are swapped to parent/child relationships, after which nodes belonging to two relationships with more than one child node are duplicated and, if all child nodes belong to a new relationship, the original node is deleted. In the example shown in FIG. 3B, the child node 348 is not removed because there is no other node group with "repetition" as a parent node or a child node. Additionally, the child node 346 is not removed even though it is duplicated, because fewer than all of the child nodes of the parent node 344 are capable of being removed. Stated another way, because the child node 348 remains, the retained node group 342 is retained and includes the child node 346 as well as the child node 348.

The method 200 includes ranking the remaining groups based on parent node counts, and ranking members of the remaining groups based on child node counts, at 210. For example, a taxonomy 350 shown in FIG. 3C shows the taxonomy after the remaining node groups are reranked based on the associated counts (e.g., frequencies). In the example shown in FIG. 3C, the node group that includes the parent node that represents "judicial notice" (due to the count "80") is ranked first, followed by the node group that includes the parent node that represents "timeliness" (due to the count "67"), followed by the node group that includes the parent node that represents "exceptions" (due to the count "45"), followed by the node group that includes the parent node that represents "sufficiency of notice" (due to the count "15"). For each of these node groups, child nodes within the node groups are ranked in descending order based on counts associated with the child nodes. As a non-limiting example, the child node that represents "notice of appeal" is ranked first in the respective node group (due to the count "25"), followed by the child node that represents "notice of breach" (due to the count "20"), followed by the child node that represents "notice of defect" (due to alphabetical ordering), followed by the child node that represents "notice to buyer" (due to the count "2"). The method 200 further includes displaying a ranked list of informational elements that correspond to the ranked groups of nodes, at 212. For example, display of ranked informational elements via a GUI is further described and illustrated with reference to FIGS. 4A-B.

Thus, by re-grouping and re-ranking items within the taxonomies illustrated in FIGS. 3A-C, the method 200 may cause items that are more relevant to a user query to be pushed closer to the top of a search result list. The re-grouping may also enable the user to simply select information across multiple contexts in ways that are possible in other legal research tools. For example, a user may now select a legal concept and retrieve all entries across multiple legal contexts with one selection. Additionally, individual nodes that are wholly subsumed under new node groups are removed to make the taxonomy more navigable.

FIGS. 4A-B depict examples of a GUI 400 of a legal research tool that is configured to perform dynamic cross-contextual interpretation of a taxonomy from a search according to one or more aspects. In some implementations, the GUI 400 may include or correspond to the GUI 120 of FIG. 1.

FIG. 4A depicts an example of the GUI 400 at a first time. At the first time, the GUI 400 may include multiple panes, such as a domain pane and a search/results pane. In other implementations, fewer or more panes than shown in FIG. 4A may be included in the GUI 400. The domain main may include multiple search domain choices 402 that may be selected by a user to perform a legal search of the selected domain. For example, the multiple search domain choices 402 may include legal issues and outcomes, fact patterns, causes actions, and other options. In other implementations, one or more of the illustrated search domain options may be omitted and/or the search domain options may include other options than shown in FIG. 4A. The search/results pane may include a type-ahead search field 404 which may enable the user to type in or otherwise provide search terms for which the user would like to perform legal research. For example, the user may type in a name of a legal context, a legal concept, or the like, to begin a legal search. The type-ahead search field 404 may be periodically polled for input characters to enable searching to be performed as terms are entered, without requiring the user to enter an entirety of the search terms or select a submit button. The search/results pane may include multiple selectable icons to enable the user to select a type of taxonomy interpretation to be performed when displaying search results. For example, the multiple selectable icons may include a taxonomy view selectable indicator 406 and a cross-context view selectable indicator 408. Although illustrated as check boxes, the selectable indicators 406, 408 may include any type of selectable icon or indicator, such as other types of buttons, selectable text, a toggle bar, or the like. Selection of the taxonomy view selectable indicator 406 may cause the GUI 400 to display search results according to an organization of a multi-layer hierarchical taxonomy, as shown in FIG. 4A. Selection of the cross-context view selectable indicator 408 may cause the GUI 400 to dynamically cross-contextually interpret the taxonomy and display the search results according to this cross-context interpretation, as further described with reference to FIG. 4B.

The search/results pane also include search results based on the search term(s) in the type-ahead search field 404. For example, the GUI 400 may display informational elements 410 according to the taxonomy in which the corresponding legal documents are organized. Informational elements 400 include multiple informational element groups that correspond to multiple node groups of the taxonomy, and that indicate the names of the various information represented by the nodes of the taxonomy. In FIG. 4A, an illustrative first informational element group 412 includes a first layer informational element 414 ("security interests and secured transactions") and a second layer informational element 416 ("notice"). The first layer informational element 414 may correspond to a parent node of the corresponding node group, and the second layer informational element 416 may correspond to a child node of the corresponding node group. Because the informational elements 414, 416 are assigned to different layers (e.g., correspond to different nodes in different layers of the taxonomy), the informational elements 414, 416 may be displayed in different columns or in some other manner to indicate the different layers. First layer informational element 414 is associated with a count 418 ("367") and second layer informational element 416 is associated with a count 420 ("15"), each of which indicate a count of legal documents in a database that correspond to the respective informational element and which can be retrieved upon selection by the user. As another example, a second informational element group 422 may include a first layer informational element ("summary judgment procedure"), a second layer informational element ("notice of claims"), and another second layer informational element ("sufficiency of notice"). Other informational element groups may be included in informational elements 410. In the example shown in FIG. 4A, the informational elements 410 are ranked in ascending alphabetical order, and members of the groups are similarly ranked in ascending alphabetical order. In other implementations, the informational elements 410 may be ranked in other ways, such as based on counts (e.g., frequencies), as described above with reference to FIGS. 1, 2, and 3A-C. One or more of the informational elements 410 may be associated with selectable icons that cause display of, or hiding of, the respective informational element within the GUI 400. For example, the informational element group 412 may be associated with a selectable icon 424 that, when selected, causes the second layer informational element 416 to be displayed (or hidden) within the GUI 400. Other selectable icons may cause display (or hiding) of first layer informational elements, second layer informational elements, informational element groups, or a combination thereof.

As explained above, the informational elements 410 are displayed in an order based on the taxonomy that organizes the documents being searched for. Such a taxonomy may allow for granular lookup of specific legal issues, but type-ahead can make it time consuming to gather one legal issue across multiple legal contexts. For example, legal concepts that are directly responsive to a type-ahead query may be pushed to the bottom of a long list of informational elements due to the organization of the taxonomy. Additionally, if the user does not know the exact taxonomy label they are looking for, they may have to look through a long list of informational elements to identify one that is relevant, especially depending on the specificity of the search terms. These problems are solved by the dynamic cross-context taxonomy interpretation described herein, and the resulting display of search results is shown in FIG. 4B.

FIG. 4B depicts an example of the GUI 400 at a second time after selection of the cross-context view selectable icon 408. As shown in FIG. 4B, the GUI 400 now displays informational elements 430, that include informational element groups that have been duplicated and reversed across the layers, regrouped, and reranked to be provided in descending order based on counts (e.g., frequencies). In this manner, the taxonomy from FIG. 4A has been dynamically rearranged based on the search query (and selection of the cross-context view selectable icon 408), thereby enabling the user to search one legal issue across multiple legal contexts. For example, an informational element group 432 includes a first layer informational element 434 ("notice") and multiple second layer informational elements, including illustrative second layer informational element 436 ("security and secured transactions"). In this example, the second layer informational element 436 is a duplicate of the first layer informational element 414 of FIG. 4A, and the first layer informational element 434 is a duplicate of the second layer informational element 416 of FIG. 4B. Duplication and reversal of nodes is further described above with reference to FIG. 3A. The informational element groups of informational elements 430 are organized in descending order based on the associated counts. For example, the informational element group 432 is displayed above the informational element group for "notice of claims" because the count "135" (e.g., 84+22+15+4+3+2+2+1+1+1) associated with the informational element group 432 is greater than the count "104" associated with the informational element group for "notice of claims." Similarly, a second layer informational element for "sufficiency of notice" is displayed above the second layer informational element 436 because the count "84" is greater than the count "1". In this manner, the dynamical cross-contextual interpretation of the taxonomy that results in the display in the GUI 400 of FIG. 4B causes smaller numbers of entries associated with strongly matching legal concepts to be pulled further toward the top of the displayed list of search results, improving browsing and user experience. Additionally, the cross-context view gathers concepts across multiple contexts, making it easier for the user to spot the specific legal documents to be reviewed. It is noted that the counts shown in parentheses in FIG. 4 refer to cases, rather than headnotes. As such, it is possible for a child count to increase without increasing the parent count if the values co-occur in a case. However, usually when a child count increases there is a corresponding increase in the total parent count or occasionally it'll be off by a couple if the concepts in the list tend to co-occur.

Figure 5:
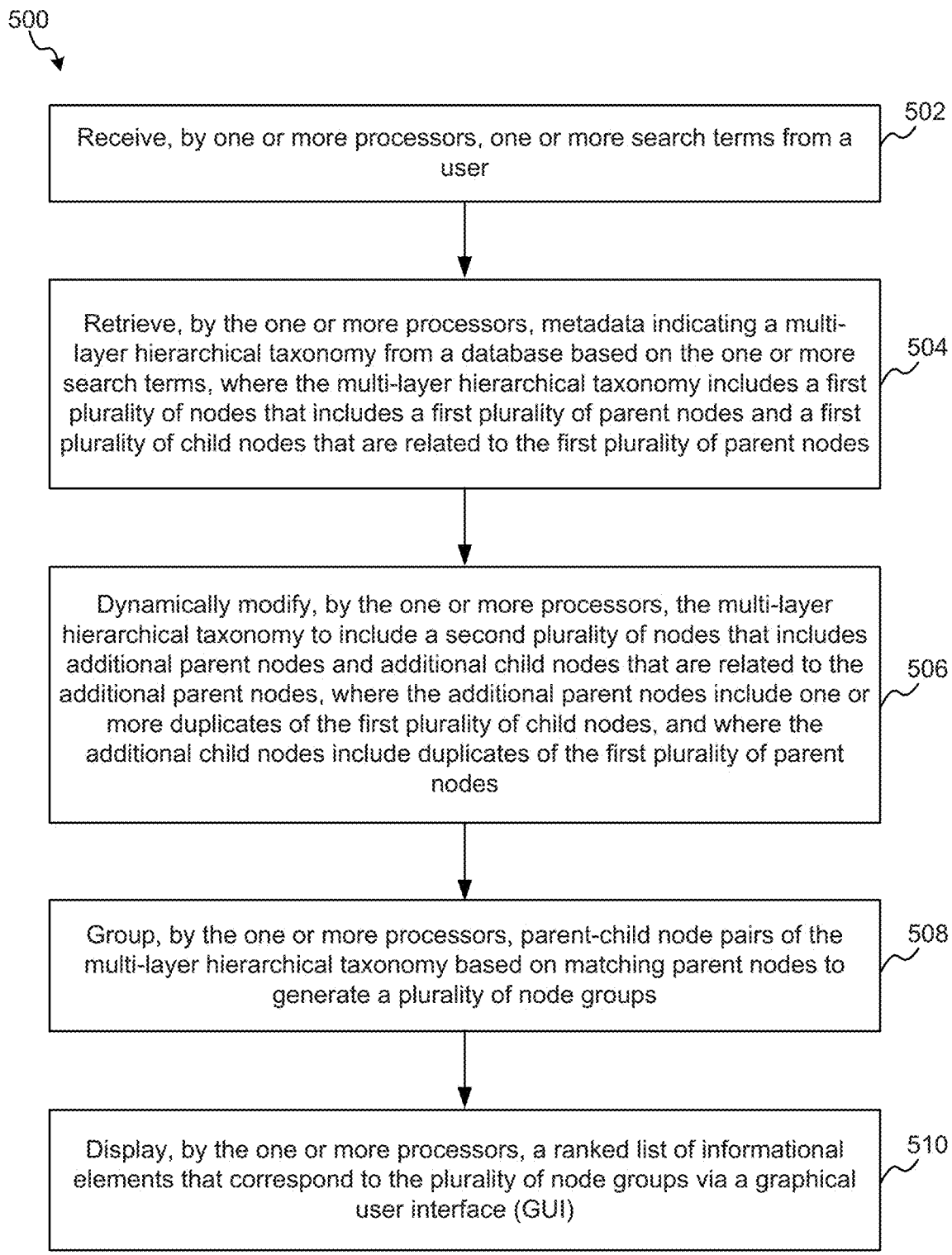
FIG. 5 is a flow diagram illustrating an example of a method for dynamic cross-contextual taxonomy search and interpretation according to one or more aspects.

FIG. 5 is a flow diagram of a method 500 for dynamic cross-contextual taxonomy search and interpretation according to one or more aspects. In some implementations, the operations of the method 500 may be stored as instructions that, when executed by one or more processors (e.g., the one or more processors of a computing device or a server), cause the one or more processors to perform the operations of the method 500. In some implementations, these instructions may be stored on a non-transitory computer-readable storage device or a non-transitory computer-readable storage medium. In some implementations, the method 500 may be performed by the system 100 of FIG. 1 (e.g., by the computing device 102), which may be configured to display the GUI 400 of FIGS. 4A-B.

The method 500 includes receiving, by one or more processors, one or more search terms from a user, at 502. For example, the one or more search terms may include or correspond to the search terms 110 of FIG. 1. The method 500 includes retrieving, by the one or more processors, metadata indicating a multi-layer hierarchical taxonomy from a database based on the one or more search terms, at 504. The multi-layer hierarchical taxonomy includes a first plurality of nodes that includes a first plurality of parent nodes and a first plurality of child nodes that are related to the first plurality of parent nodes. For example, the metadata may include or correspond to the legal document metadata 170 of FIG. 1, the multi-layer hierarchical taxonomy may include or correspond to the multi-layer hierarchical taxonomy 112 of FIG. 1, and the first plurality of nodes may include or correspond to the first plurality of nodes 114 of FIG. 1.

The method 500 includes dynamically modifying, by the one or more processors, the multi-layer hierarchical taxonomy to include a second plurality of nodes that includes additional parent nodes and additional child nodes that are related to the additional parent nodes, at 506. The additional parent nodes include one or more duplicates of the first plurality of child nodes, and the additional child nodes include duplicates of the first plurality of parent nodes. For example, the second plurality of nodes may include or correspond to the second plurality of nodes 116 of FIG. 1. In some implementations, the additional parent nodes include, for each child node of the first plurality of child nodes, a duplicate of the child node, and the additional child nodes include, for each parent node of the first plurality of parent nodes, a duplicate of the parent node, as further described with reference to FIGS. 2 and 3A-C.

The method 500 includes grouping, by the one or more processors, parent-child node pairs of the multi-layer hierarchical taxonomy based on matching parent nodes to generate a plurality of node groups, at 508. For example, the second plurality of nodes 116 may be grouped into node groups that have the same parent node. The method 500 includes displaying, by the one or more processors, a ranked list of informational elements that correspond to the plurality of node groups via a GUI, at 510. For example, the ranked list may include or correspond to the ranked list 122 of FIG. 1, and the GUI may include or correspond to the GUI 120 of FIG. 1 or the GUI 400 of FIGS. 4A-B.

In some implementations, the multi-layer hierarchical taxonomy corresponds to legal issues, the first plurality of parent nodes correspond to legal contexts, and the first plurality of child nodes correspond to legal concepts, as shown in the examples of FIGS. 3A-C. In some such implementations, the additional parent nodes correspond to the legal concepts, and the additional child nodes correspond to the legal contexts.

In some implementations, grouping the parent-child node pairs of the multi-layer hierarchical taxonomy includes assigning each of the parent-child node pairs to one of the plurality of node groups based on a parent node of a parent-child node pair matching a parent node of a node group. Each node group of the plurality of node groups includes a respective parent node and one or more respective child nodes. For example, as shown in FIGS. 4A-B, each group may include a parent node and one or more child nodes. Additionally or alternatively, the method 500 may further include removing, by the one or more processors and prior to ranking the plurality of node groups, one or more node groups of the plurality of node groups based on duplicates of all child nodes of the one or more node groups being included in one or more other node groups of the plurality of node groups as respective parent nodes or respective child nodes. For example, one or more node groups may be removed as described with reference to FIGS. 2 and 3A-C.

In some implementations, the method 500 also includes ranking, by the one or more processors, the plurality of node groups based on counts associated with parent nodes of the plurality of node groups. For example, the counts may include or correspond to the counts 118 of FIG. 1. In some such implementations, the method 500 may also include ranking, by the one or more processors, child nodes of each of the plurality of node groups within the respective node group based on counts associated with the child nodes. For example, the groups may be ranked based on counts associated with the parent nodes, and each child node of a group may be ranked within the respective group based on counts associated with the child node, as described with reference to FIGS. 4A-B.

In some implementations, the GUI displays the ranked list of the informational elements in a hierarchical arrangement in which informational elements that correspond to parent nodes are included in a first layer and informational elements that correspond to child nodes are included in a second layer. Examples of such a GUI are shown in FIGS. 4A-B. In some such implementations, for a first informational element included in the first layer, a count associated with the first informational element is equal to a sum of counts of each informational element in the second layer that has a relationship to the first informational element.

In some implementations, the ranked list of informational elements is displayed via the GUI based on user input indicating selection of a cross-contextual taxonomy view option. For example, the cross-contextual taxonomy view option may include or correspond to the cross-context view selectable indicator 408 of FIGS. 4A-B. In some such implementations, the method 500 further includes displaying, via the GUI, a ranked list of informational elements that correspond to the first plurality of nodes based on selection of a standard taxonomy view option. For example, the standard taxonomy view option may include or correspond to the taxonomy view selectable indicator 406 of FIGS. 4A-B.

In some implementations, the method 500 also includes receiving the one or more search terms by periodically sampling an entry in a type-ahead search field of the GUI. For example, the type-ahead search field may include or correspond to the type-ahead search field 404 of FIGS. 4A-B. Additionally or alternatively, the GUI may include a selectable icon associated with a first group of informational elements that share a respective parent node, and the selectable icon may be configured to cause display of, or to hide, informational elements of the first group that correspond to child nodes. For example, the selectable icon may include or correspond to the selectable icon 424 of FIG. 4A.

Components, the functional blocks, and the modules described herein with respect to FIGS. 1-5) include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/of" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A computing device comprising:
   a display;
   one or more processor;
   a graphical user interface (GUI) configured to be presented on the display; and
   a non-transitory computer-readable storage device storing instructions that, when executed by the one or more processor, cause the computing device to:
      present, at the GUI and responsive to a first user input, a first list of informational elements corresponding to a first plurality of node groups, the first plurality of node groups being based on a multi-layer hierarchical taxonomy and including a first plurality of parent nodes and first plurality of child nodes; and
      present, at the GUI and responsive to a second user input, a second list of informational elements corresponding to a second plurality of node groups, the second plurality of node groups being based on a dynamic modification of the multi-layer hierarchical taxonomy and including a second plurality of parent nodes and a second plurality of child nodes, at least one parent node of the second plurality of parent nodes being a duplicate of at least one child node of the first plurality of child nodes.

2. The computing device of claim 1, wherein:
   the second plurality of child nodes includes at least one child node being a duplicate of at least one parent node of the first plurality of parent nodes.

3. The computing device of claim 1, wherein:
   the first user input includes a first search term received at the GUI; and
   the second user input includes a selection of a selectable indicator presented at the GUI.

4. The computing device of claim 3, wherein the dynamic modification of the multi-layer hierarchical taxonomy is responsive to the selection of the selectable indicator.

5. The computing device of claim 1, wherein the instructions, when executed by the one or more processor, further cause the computing device to present a search field, at the GUI, to receive the first user input.

6. The computing device of claim 1, wherein the instructions, when executed by the one or more processor, further cause the computing device to present one or more selectable indicators including at least one of:
   one or more selectable search domain indicators,
   a selectable taxonomy view indicator, or
   a selectable cross-context view indicator.

7. The computing device of claim 6, wherein, the first list of informational elements presented a the GUI or the second list of informational elements presented at the GUI is at least partly based on a selection of the one or more selectable indicators.

8. The computing device of claim 1, wherein the multi-layer hierarchical taxonomy corresponds to legal issues, the first plurality of parent nodes correspond to legal contexts, and the first plurality of child nodes correspond to legal concepts.

9. The computing device of claim 8, wherein the second plurality of parent nodes correspond to the legal concepts and the second plurality of child nodes correspond to the legal contexts.

10. A non-transitory computer-readable storage device storing instructions that, when executed by one or more processor, perform operations comprising:
    receive, at a graphical user interface (GUI), a first user input;
    present, at the GUI and responsive to the first user input, a first list of informational elements corresponding to a first plurality of node groups, the first plurality of node groups being based on a multi-layer hierarchical taxonomy and including a first plurality of parent nodes and first plurality of child nodes;
    receive, at the GUI, a second user input; and
    present, at the GUI and responsive to the second user input, a second list of informational elements corresponding to a second plurality of node groups, the second plurality of node groups being based on a dynamic modification of the multi-layer hierarchical taxonomy and including a second plurality of parent nodes and a second plurality of child nodes, the second plurality of parent nodes being duplicates of the first plurality of child nodes and the second plurality of child nodes being duplicates of the first plurality of parent nodes.

11. The non-transitory computer-readable storage device of claim 10, wherein:
    the first user input includes a search term input received at a search field presented at the GUI; and
    the second user input includes selection of a selectable indicator presented at the GUI.

12. The non-transitory computer-readable storage device of claim 10, wherein the first plurality of child nodes includes at least one child node presented as duplicated under at least two different parent nodes of the first plurality of parent nodes.

13. The non-transitory computer-readable storage device of claim 10, wherein the first plurality of parent nodes are presented as a first layer of informational elements and the first plurality of child nodes are presented as a second layer of informational elements.

14. The non-transitory computer-readable storage device of claim 13, wherein the first layer of informational elements corresponds to a first column and the second layer of informational elements corresponds to a second column.

15. The non-transitory computer-readable storage device of claim 14, wherein the second plurality of child nodes are presented as the first layer of informational elements and the second plurality of parent nodes are presented as the second layer of informational elements.

16. The non-transitory computer-readable storage device of claim 14, wherein presenting the first list of informational elements includes presenting one or more count values next to the first plurality of parent nodes or the first plurality of child nodes.

17. A system comprising:
one or more processor; and
a non-transitory computer-readable storage device storing instructions that, when executed by the one or more processor, cause the system to:
receive one or more user inputs;
present, at a graphical user interface (GUI) and responsive to the one or more user inputs, a first list of informational elements corresponding to a first plurality of node groups, the first plurality of node groups being based on a multi-layer hierarchical taxonomy and including a first plurality of parent nodes as a first layer and first plurality of child nodes as a second layer; and
present, at the GUI and responsive to the one or more user input, a second list of informational elements corresponding to a second plurality of node groups, the second plurality of node groups being based on a dynamic modification of the multi-layer hierarchical taxonomy and including a second plurality of parent nodes as the first layer and a second plurality of child nodes as the second layer, the second plurality of child nodes being duplicates of the first plurality of parent nodes.

18. The system of claim 17, wherein the second plurality of parent nodes are duplicates of the first plurality of child nodes.

19. The system of claim 17, wherein:
the instructions, when executed by the one or more processor, cause the system to present a selectable cross-context view indicator, and
the dynamic modification of the multi-layer hierarchical taxonomy is responsive to the one or more user inputs including a selection of the selectable cross-context view indicator.

20. The system of claim 19, wherein the selectable cross-context view indicator is presented at the GUI simultaneously with the first list of informational elements and the second list of informational elements.

* * * * *